Figure 1:
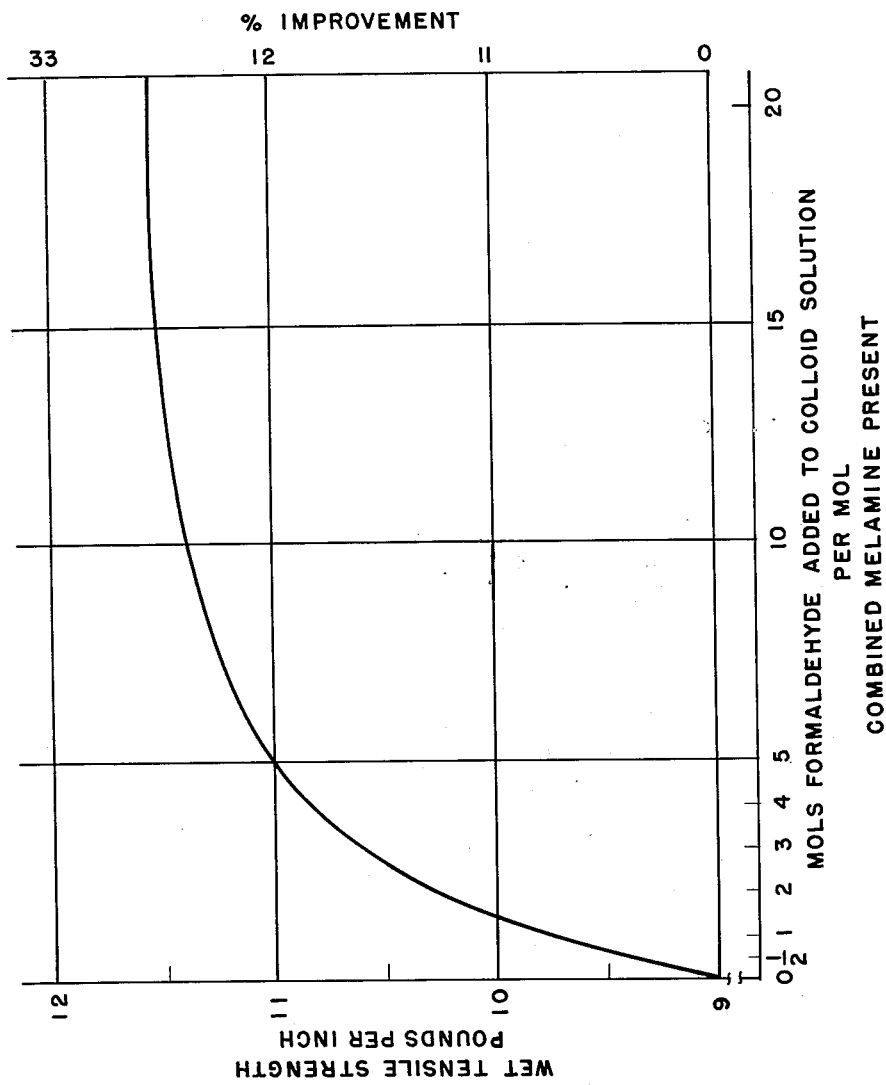

INVENTOR.
CHARLES S. MAXWELL
ATTORNEY

May 30, 1961 C. S. MAXWELL 2,986,489
MELAMINE RESIN COLLOID AND MANUFACTURE
OF WET-STRENGTH PAPER THEREWITH
Filed Jan. 28, 1958 3 Sheets-Sheet 3

INVENTOR.
CHARLES S. MAXWELL
BY
*Evans Kahn*
ATTORNEY

2,986,489
Patented May 30, 1961

2,986,489
MELAMINE RESIN COLLOID AND MANUFACTURE OF WET-STRENGTH PAPER THEREWITH

Charles S. Maxwell, Old Greenwich, Conn., assignor to American Cyanamid Company, New York, N.Y., a corporation of Maine Filed Jan. 28, 1958, Ser. No. 711,680

12 Claims. (Cl. 162—166)

The present invention relates to improved aqueous acid cationic melamine-formaldehyde resin colloid solutions having an increased wet strengthening action on formed cellulosic papermaking fibers and to their methods of preparation. The invention includes the novel fortified colloids themselves, their methods of preparation, the treatment of cellulosic papermaking fibers and other similar materials therewith, and paper and other products composed of or containing cellulosic fibers pretreated wtih the improved resin colloids.

A variety of aqueous acid cationic melamine-formaldehyde resin colloid solutions are known, being described in U.S. Patents Nos. 2,345,543, 2,417,014 and 2,564,925. The solutions are generally prepared by dissolving a methylol melamine in aqueous acid and aging the resulting solution until the methylol melamine has attained a degree of polymerization such that particles are in the hydrophilic colloidal range and are positively charged (cationic); the colloid solutions thus obtained have acid pH values in the range of about 0.5 to 5 when measured at 12% resin solids. The colloid condition is indicated by the presence of a blue haze in the solution. Mixtures of methylol melamines with uncured urea-formaldehyde resins and copolymers of melamine urea with formaldehyde can also be converted into cationic colloids by the same procedure, as is shown in U.S. Patents Nos. 2,485,079 and 2,485,080.

The above-described colloidal cationic melamine resin solutions are principally employed in the manufacture of wet-strength paper by the processes described in U.S. Patents Nos. 2,548,513, 2,559,220 and 2,559,221. The present practice of paper mills using these processes is to run a dilute solution of the colloid into an aqueous slurry of cellulosic papermaking fibers at a point near the wire of the papermaking machine, after physical treatment of the fibers has been completed. A substantial proportion of the resin is adsorbed by the fibers and the adsorbed resin cures when the wet web is dried and heated by passage over steam-heated drying rolls. The effect of the adsorbed resin when present in thermocured form in dry paper is to bond or "spot-weld" a substantial proportion of the cellulosic fibrils together, thus producing a water-resistant bond between the paper fibers and imparting wet strength to the cellulosic sheet. A substantial increase in the folding endurance of the paper is also obtained by this treatment.

My present invention is based on the discovery of an improvement in the above-described aqueous melamine resin colloid solutions whereby they are rendered more efficient for wet strength paper manufacture and for other purposes. This improvement is obtained by reacting the resin colloid solutions described above with formaldehyde, whereby the wet strengthening properties of the colloid for waterlaid cellulosic papermaking fibers are substantially increased. By employing optimum quantities of added formaldehyde followed by adequate aging I have been able in preferred instances to increase the wet strengthening properties of the colloid by more than 30%. The paper obtained is characterized by a substantially higher wet strength as compared with corresponding paper of the same basis weight prepared from the same stock and containing the same adsorbed amount of the parent resin colloid in place of the fortified colloid. Improved dry strength and bonding properties are also frequently obtained.

In carrying out the process of my invention I prefer to employ ordinary commercial formalin (37% aqueous formaldehyde solution) as the reagent to be reacted with the melamine resin colloid solutions; however, formaldehyde in other forms may of course be used. Thus, such materials as gaseous formaldehyde, paraformaldehyde or trioxymethylene may be employed if desired. An improvement in the wet strengthening action of the colloid is obtained by combining therewith small quantities of formaldehyde on the order of 0.5 mol for each mol of combined melamine present, and increases with increasing amounts of combined formaldehyde until an apparent plateau is reached. For practical purposes the minimum quantity of formaldehyde to be added is usually on the order of 1–3 mols per mol of melamine, since this amount of formaldehyde appears generally sufficient to produce roughly half of the maximum improvement obtainable. From these minima the practically usable quantities of added formaldehyde range to about 7–10 mols with further improvements being noted when up to about 15 mols are used. Above 15 mols the further increases in wet strengthening action ordinarily do not justify the cost of additional formaldehyde. It will therefore be understood that, as used in the appended claims, the term "effective amount" of formaldehyde means a quantity which fortifies, i.e. improves the wet strengthening action of the colloid, usually within the range of from about ½ mol as a minimum to about 15 mols as a maximum, expressed as mols of formaldehyde per mol of combined melamine in the colloidal resin solution.

From the foregoing it will be seen that the fortified colloid solutions of the present invention are essentially the products obtained by reacting with formaldehyde a colloidal aqueous solution of a partially polymerized, positively charged, melamine formaldehyde condensation product having a pH value within the range of 0.5 to 5 when measured at 12% resin solids and a degree of polymerization such that the resin particles are within the colloidal range. This reaction results in the combination of additional formaldehyde with the colloidal resin particles and thereby modifies them to a condition in which their efficiency for the production of wet strength paper is remarkably improved. The reaction may be carired out either by adding the formaldehyde to the melamine resin acid colloid after it has been formed or by adding it prior to the colloid formation such as at the time when the methylolmelamine is dissolved in aqueous acid.

When the fortified colloids are made by adding formaldehyde to previously prepared melamine resin acid colloids the fortifying reaction is carried out by aging the solutions until their wet strengthening properties have substantially increased. Short aging periods on the order of one hour at room temperature produce a substantial beneficial effect but I prefer to age the solution about eight hours, this period generally resulting in substantial completion of the fortification while avoiding unduly long solution retention times.

When colloids of improved wet strengthening properties are made by incorporating additional formaldehyde into a freshly prepared acidified methylolmelamine solution the rate of conversion into a cationic colloid capable of adsorption on cellulosic papermaking fibers is retarded by the excess formaldehyde and therefore a longer aging time may be required. However the presence of relatively small amounts of additional formaldehyde on the order of about 1 to 5 mols for each mol of melamine extends the aging time for only a few hours, and any disadvantage resulting from this delay is frequently offset by the greater convenience of mixing all of the ingredients together at one time. Furthermore the delay in producing a fully ripened fortified colloid can be at least partially avoided by reducing slightly the acidity of the solution. For use in paper mills where the improved efficiency obtained with about 1–5 mols of additional formaldehyde per mol of melamine is adequate, simplified methods of preparation in which all of the reagents are mixed together at one time are therefore suitable.

Typical of such methods are those in which a melamine-formaldehyde condensation product such as the well known powdered trimethylolmelamine now in wide commercial use for the preparation of ordinary acid colloids is dissolved in water containing about 1–5 mols of formaldehyde and about 0.5–0.8 mol of hydrochloric acid for each mol of melamine and the resulting clear solutions are aged at about 6–12% resin solids and at room temperature for about 3–12 hours, depending on the amount of acid present, or overnight. Further simplified procedures employing melamine itself may be used; thus a methylolmelamine syrup may be prepared by reacting 1 mol of melamine with about 4 to 10 mols of aqueous 37% formaldehyde under neutral or slightly alkaline conditions and this is diluted with water containing about 0.5–0.8 mol of hydrochloric acid, or sufficient other suitable acid to produce a pH of about 0.5–5, and aged for about 3–16 hours until a formaldehyde-reacted colloid is obtained. A procedure suitable for continuous fortified colloid production consists in dissolving melamine in a hot (50°–95° C.) aqueous solution containing the proportions of formaldehyde and hydrochloric acid indicated above followed by a preferably immediate cooling to ensure stability and aging for about 3 to 16 hours at 6–12% resin solids and at room temperature. Other methods of combining the essential reagents for producing the fortified colloids will be evident from the foregoing and from the additional examples which follow, and are included within the broader aspects of the invention.

The fortified resin colloid solutions of the present invention are employed in the manufacture of wet-strength paper by forming a water suspension of cellulosic papermaking fibers, adding an effective amount of fortified resin colloid solution thereto as wet strengthening agent, forming the fibers into paper, and heating the paper to cure the resin adsorbed therein.

The fibrous suspension is advantageously treated with the colloid at a fiber consistency of 0.5%–3% by weight. The colloid solution may be diluted to 3%–8% resin solids content, if desired, to facilitate metering and is preferably added after physical treatment of the fibers has been completed. The fortified colloid of the present invention is adsorbed by the fibers substantially as rapidly as its parent colloid, and thus is preferably added at a point between the beater and the wire including the fan pump or head box of the papermaking machine. The treated paper fibers generally contain about ½%–4% by weight of the resin but about 0.1% to 1% of colloid resin solids appears satisfactory in the case of paper intended for light use such as paper napkins and paper towels, and about 1%–4% appears satisfactory for the manufacture of paper intended for heavy use such as paper bags, military maps and laundry tags. Larger amounts of resin (i.e., in excess of 5%) produce greater wet strength and less than 0.1% usually produces a perceptible benefit.

In addition to the increased efficiency of the fortified resin colloid solutions in producing wet strength paper under ordinary papermaking conditions, as described above, their improved performance in the presence of relatively high concentrations of dissolved sulfate ion constitutes another important advantage. As is shown in my U.S. Patent No. 2,559,221 both the quantity of resin retained in the paper and the wet tensile strength decrease when the aqueous paper pulp suspensions to which the previously known melamine resin acid colloids are added contain more than about 100–150 parts per million of sulfate ions. The fortified resin colloid solutions obtained by reaction of the known colloids with formaldehyde, however, are much more sulfate ion-resistant, and function at much higher efficiency when added to fiber suspensions in water containing from 150 to 1,000 parts per million of dissolved sulfate ions and higher.

The process of my invention is therefore particularly usefully applied in paper mills which manufacture rosin sized paper and recirculate the white water to conserve raw materials and minimize stream pollution. In such mills the fibers are generally beaten, refined or otherwise hydrated at high consistencies (e.g. 2% to 6% or more) in water having a low dissolved sulfate ion content (less than about 150 parts per million) and the pulp is diluted to sheet-making consistency (e.g. 0.2%–1%) by recycling the white water. In such process the dissolved sulfate ion concentration of the pulp is usually disadvantageously high throughout. Addition of rosin size and alum to the high consistency pulp introduces about 400 to 1600 parts per million of dissolved sulfate ion, and this concentration does not materially change thereafter as the concentration of dissolved sulfate ions in recirculated white water is about the same.

In such process it is generally desirable to introduce the wet strength resin as near to the wire as possible. The present invention permits melamine-formaldehyde acid colloid to be added at any desired point near the wire with no loss in efficiency even in the presence of substantial amounts of recirculated dissolved sulfate ions.

The fibers to which the colloid is applied may be any of the cellulosic papermaking fibers normally employed for papermaking, including fibers which have previously been rosin sized.

The wet webs carrying the wet strengthening resin of the present invention may be passed over steam-heated rolls which bring the paper to a temperature of 190°–260° F. or more for about ½ to 3 or more minutes, whereby the paper is dried and the resin cured. The resins of the present invention cure within about the same temperature-time range as the parent resins from which they are derived.

The manufacture of paper according to the present invention does not depend upon employment of the preferred conditions set forth above. Beneficial effects from the invention are obtained when paper is made outside of the conditions recited.

Figure 2:
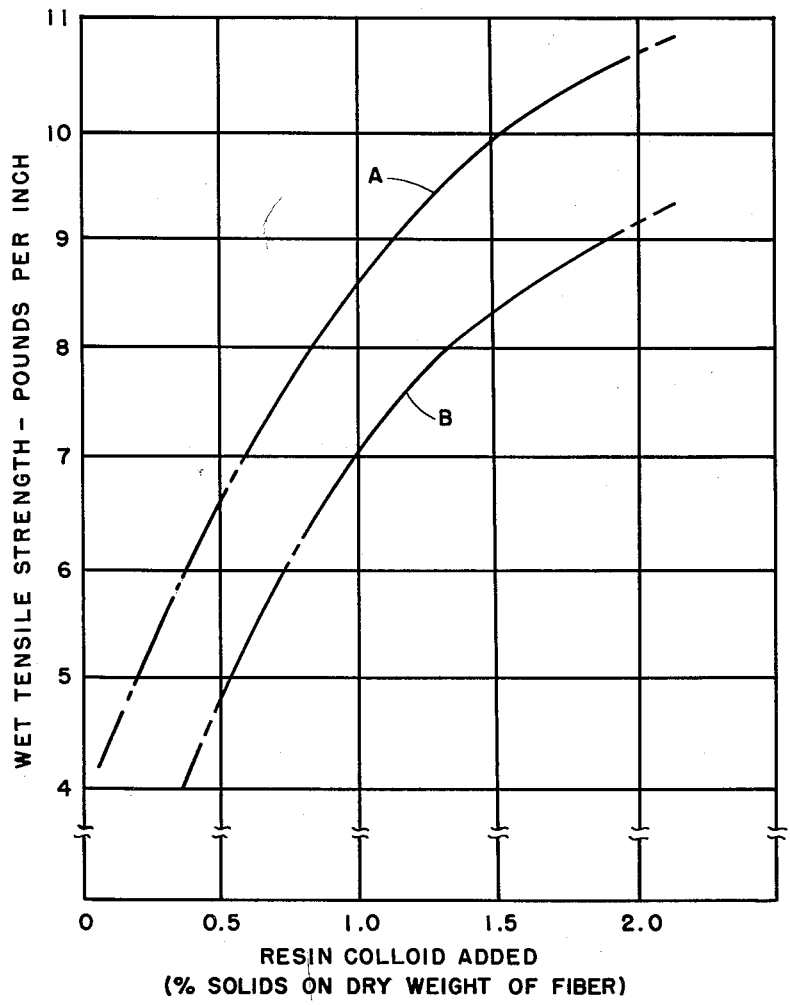
Figure 3:
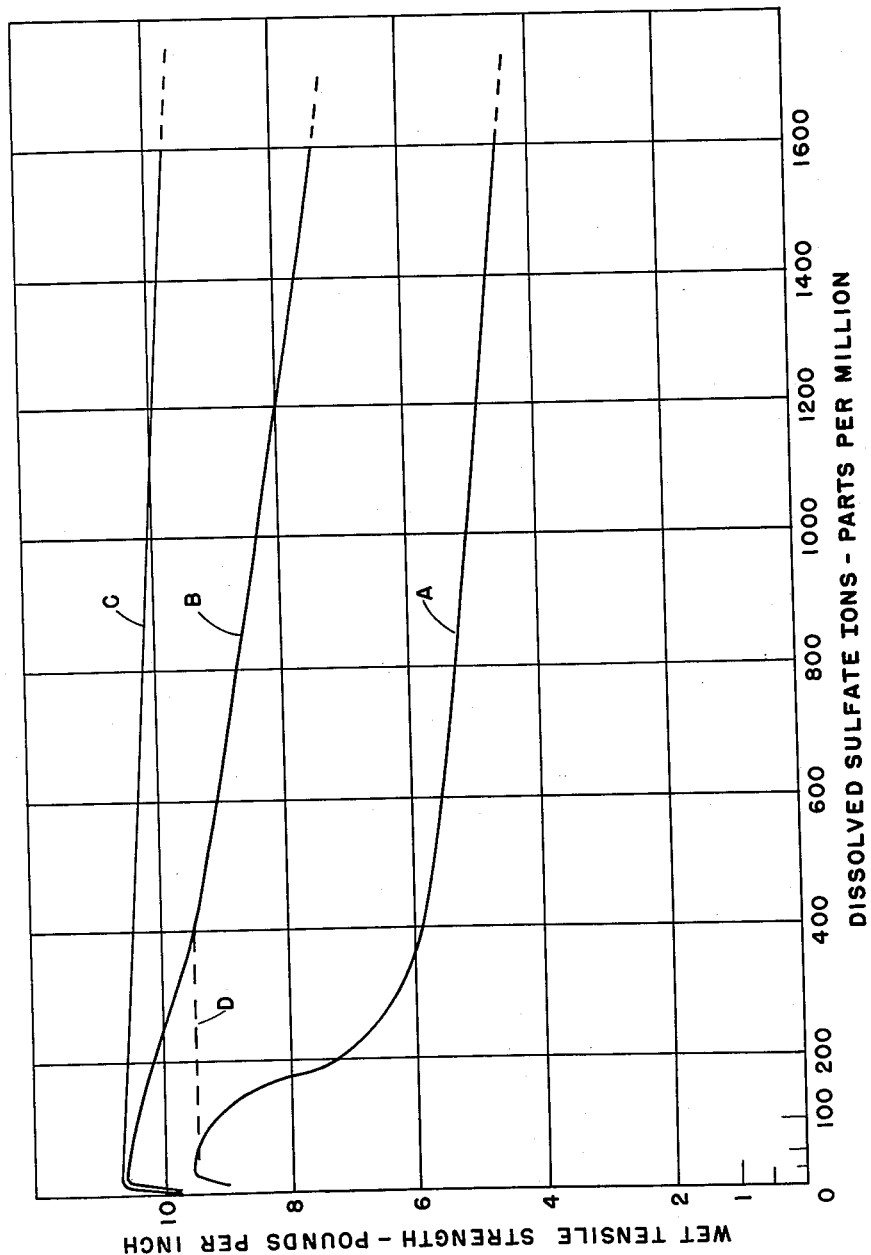

The improvements obtained by the invention are demonstrated graphically in the accompanying drawings wherein:

Figure 1 is a plot of the wet tensile strength developed in paper by a series of typical fortified melamine resin colloid solutions prepared according to the present invention showing the effect of increasing amounts of formaldehyde added to the parent colloid solution;

Figure 2 is a plot of the wet tensile strength developed in paper at various concentrations by a preferred colloid of Figure 1 (Curve A) shown in comparison with the wet tensile strength developed by its parent colloid (Curve B); and Figure 3 is a plot of the wet strength developed by three series of wet strength papers as a function of the dissolved sulfate ion concentration present at the point of addition.

The data for Figure 1 were accumulated by adjusting a master batch of bleached northern kraft pulp beaten to a Green freeness of about 450 ml. to a consistency of 0.6%, adding 1% by weight of alum based on the weight of the fibers to buffer the suspension at pH 4.5, dividing the batch into aliquots of standard volume, adding 2% of one of the test (fortified) melamine-formaldehyde resin colloid solutions (described below) to each aliquot (resin solids based on the dry weight of the fibers), gently stirring the aliquots for 10 minutes to permit adsorption of the resin to go to equilibrium, sheeting the fibers in the aliquots at a basis weight of about 50 pounds (25" x 40"/500), drying the sheets on a drum for one minute at 240° F., and determining the wet tensile strength of the sheets by the TAPPI method after conditioning the sheets by soaking them for 16 hours in demineralized water at room temperature.

The fortified resin colloid solutions were prepared by adding 37% formalin in proportions shown in the graph to aliquots of a melamine-formaldehyde resin colloid solution at 12% solids concentration and aging the resulting solutions overnight.

The parent melamine-formaldehyde resin colloid solution had been prepared by dissolving spray-dried trimethylolmelamine powder in sufficient aqueous hydrochloric acid to provide 0.9 mol of hydrogen chloride per mol of combined melamine present, the strength of the acid being predetermined to provide a colloid solution containing 12% resin solids by weight, and aging the mixture overnight.

Figure 1 shows that the wet strengthening effect of the parent resin colloid solution was substantially improved by aging the colloid solution in the presence of added formaldehyde. The curve shows that use of the untreated parent colloid gave a wet strength of 9.0 lb./in., that aging the colloid in the presence of only 0.5 mol of added formaldehyde caused the wet strength to increase to 9.4 lb./in., a significant increase. The results further show that aging the colloid in the presence of respectively 5 and 20 mols of added formaldehyde caused the wet strength of the paper obtained to increase to 11.0 and 11.5 lb./in. The scale at the right-hand side of the graph shows that these wet strength values mentioned respectively correspond to increases of about 5%, 22% and 27% over the wet strength imparted by the untreated parent resin colloid solution. The scale further shows that about one-half of the total increase in wet strength resulted from aging in the presence of only two moles of added formaldehyde and that about three-quarters of the increase resulted from the similar treatment with between 4 and 5 mols of added formaldehyde.

The data upon which the curves of Figure 2 are based were obtained in the same general manner as the data for the curve of Figure 1. The data for Curve A were obtained by use of the parent melamine resin colloid solution aged overnight in the presence of five mols of added formaldehyde per mol of combined melamine therein, and the data for Curve B were obtained by use of the parent colloid solution itself.

Comparison of the curves of Figure 2 shows that about 0.2% of the fortified resin colloid (Curve A) produced about the same wet strength (5 pounds) as more than twice as much (about 0.55%) of the parent resin colloid (Curve B). The curves further show that at the typical resin addition level of 0.5% the parent colloid imparted a wet strength of 4.75 lb./in., whereas the fortified resin colloid imparted a wet strength of 6.6 lb./in., an increase of 1.85 lb./in. or 39%.

The curves rise quite uniformly, and from other data it is known that the fortifying action of the formaldehyde remains evident when the colloid is added in amounts of 5%, based on the dry weight of the fibers.

Figure 3 shows the improved performance of formaldehyde-reacted colloids over that of their parent melamine-formaldehyde resin colloid when added to aqueous paper pulp suspensions containing increasing concentrations of dissolved sulfates.

Curve A shows the results obtained by addition of ordinary (i.e., untreated) melamine-formaldehyde acid colloid to the pulp without preliminary formaldehyde treatment of the colloid. Curve B shows the results obtained by addition of the same acid colloid which, however, had been aged to equilibrium in the presence of 5 mols of added formaldehyde per mol of melamine therein. Curve C shows the results obtained by addition of the acid colloid of Curve A which, however, had been aged to equilibrium in the presence of 10 mols of added formaldehyde.

In each instance paper was made by use of the same parent melamine-formaldehyde acid colloid (formed according to the procedure of U.S. Patent No. 2,559,220) and in each instance 2% of the colloid (calculated as methylolmelamine based on the dry weight of the fibers) was added to an aqueous suspension of beaten northern kraft pulp at a consistency of 0.6%, the dissolved sulfate ion content of the pulp being adjusted to the values shown in the graph by addition of up to 2% alum followed by sodium sulfate. Thereafter the pulp suspensions were sheeted and dried in uniform manner. There were only two variables. The first was the treatment (or lack of treatment) of the resin colloid with formaldehyde. The second was the dissolved sulfate ion content in the pulp during addition of the colloid. The graphs are based on averaged data of a number of parallel laboratory trials.

From Curve A it will be seen that a rapid decrease in wet strength results once the dissolved sulfate ion content exceeds 100–150 parts per million. Beginning with a value of 400 parts per million (corresponding to a decrease in wet tensile strength of about one-third) the decrease in wet strength is virtually linear, and at a dissolved sulfate ion concentration of 1600 parts per million about half the wet strength is lost.

Curve B (taken with guide line D) shows that pre-treatment of the colloid with 5 mols of formaldehyde per mol of combined melamine present entirely counteracts the deleterious effect of up to 400 parts per million of dissolved sulfate ions, and thereafter, counteracts this effect by more than half.

Curve C shows that pre-treatment of the colloid with 10 mols of formaldehyde per mol of combined melamine present counteracts the deleterious effect of at least up to 1600 parts per million of dissolved sulfate ions.

Subsequent work has shown that the addition of about 3 to 9 mols of formaldehyde is a practical range which largely overcomes the sulfate ion problems of most paper mills. The use of materially more than 10 mols is generally unnecessary, and in the drawing a plot of the results obtained by pre-treating the colloid with 15 mols of formaldehyde would substantially overlie Curve C.

Any of the acids used in preparing the known melamine-formaldehyde resin colloids, such as the hydrochloric, acetic, formic, phosphoric and sulfurous acids disclosed as suitable in U.S. Patent No. 2,345,543 may be employed in making the fortified colloids of the present invention. This patent also shows suitable amounts of these acids in terms of the pH values obtained. These acids, when used as described, produce acid colloids having pH values always less than 5.0 and generally in the range of 1.0–2.5 when measured at 25° C. and 12% resin solids content. U.S. Patent No. 2,417,014, however, shows that higher pH values may be obtained by preparing the colloid solution in the presence of a polyhydric alcohol or polyhydric alcohol ether. In commercial practice hydrochloric acid has generally been employed since between about 0.6 and 1.0 mol of this acid is generally suitable for colloid formation, whereas a larger amount is usually needed in the case of the other acids.

The invention will be more particularly described by reference to the examples which follow. These examples illustrate specific embodiments of the invention and are not to be construed as limitations thereon. Parts are by weight unless otherwise stated.

EXAMPLE 1

The following illustrates one method of treating a typical aminotriazine-aldehyde resin colloid and shows on a comparative basis the effect of the addition of increasing amounts of formaldehyde on the wet strength developed by the resin at different addition levels.

A master batch of an aqueous acid cationic melamine-formaldehyde resin colloid solution was prepared by dissolving 114 parts of commercial spray-dried trimethylolmelamine in 886 parts of hydrochloric acid of such strength as to provide 0.8 mol of HCl per mol of combined melamine present. The resulting solution was aged at room temperature overnight, at the end of which time a blue colloidal solution was found to have developed. The tone and opacity of the haze and hydrophilic properties of the resin remained constant thereafter, showing that the resin colloid had arrived at substantial equilibrium. The pH of the colloid solution was 1.80.

Three 218-gm. portions (each containing 25 gm. of solids) of the resin colloid solution were withdrawn. One portion was reserved as control. To the second was added 5 mols of 37% aqueous formalin per mol of combined melamine therein, and to the third portion was added 10 mols of aqueous 37% formalin calculated on the same basis.

Deionized water was then added to the control and the second portions to bring the volume of these portions up to the volume of the third portion.

All three portions were gently stirred for a few minutes and allowed to age overnight at room temperature. No significant change was observed the following morning in their viscosity, hydrophilic properties or in the appearance of the colloidal haze therein. The pH of the control solution remained substantially constant, but the pH of the solution to which 5 mols of formalin had been added dropped to 1.30. This evidenced release of acid which had previously been combined in the resin. From subsequent work it is known that the pH of the third portion decreased by a similar amount.

The properties of the resulting colloidal resin solutions were determined in terms of their effectiveness as wet strength paper agents according to a standard laboratory procedure. According to this procedure bleached northern kraft pulp was formed into an aqueous suspension at 0.6% consistency, 1% of alum based on the weight of the fibers therein added to provide optimum sulfate ion concentration, and the amount of colloid solution added to provide resin as shown in the table below. The treated pulps were stirred briefly and allowed to stand 10 minutes to insure adsorption of all the resin, after which they were made into handsheets on a Nash handsheet machine. The sheets were dried on a laboratory rotary drum dryer for 1 minute at 240° F. (thereby substantially curing the resin) and conditioned by soaking in demineralized water for 16 hours at room temperature. The wet tensile strength values of the sheets were then determined by the TAPPI method. Results were as follows:

| Run No. | Percent Resin Added [1] | Mols $CH_2O$ [2] | Paper Basis Wt. [3] | Wet Strength Lb./in.[4] | Increase [5] Lb./in. | Increase [5] Percent |
|---|---|---|---|---|---|---|
| Control A | 0.2 | 0 | 49.2 | 3.6 | | |
| A-1 | 0.2 | 5 | 47.3 | 4.7 | 1.1 | 30.5 |
| A-2 | 0.2 | 10 | 47.6 | 4.9 | 1.3 | 36.2 |
| Control B | 0.5 | 0 | 48.9 | 5.4 | | |
| B-1 | 0.5 | 5 | 48.7 | 7.1 | 1.7 | 31.4 |
| B-2 | 0.5 | 10 | 47.9 | 7.2 | 1.8 | 33.4 |
| Control C | 2.0 | 0 | 48.1 | 8.9 | | |
| C-1 | 2.0 | 5 | 48.1 | 10.5 | 1.6 | 18.0 |
| C-2 | 2.0 | 10 | 48.4 | 10.9 | 2.0 | 22.4 |
| Control D | 3.0 | 0 | 49.5 | 9.6 | | |
| D-1 | 3.0 | 5 | 49.2 | 10.5 | 0.9 | 9.4 |
| D-2 | 3.0 | 10 | 48.1 | 10.9 | 1.3 | 13.5 |

[1] Calculated as trimethylolmelamine, based on the dry weight of fibers.
[2] Mols $CH_2O$ added to the resin colloid solution (per mol of combined melamine therein).
[3] Lb./25″ x 40″/500 ream.
[4] Lb./inch; corrected to 50 lb. basis weight.
[5] Over control.

The four control runs illustrate the wet strength developed at different resin addition levels from the parent resin colloid.

The remaining results show that the formaldehyde treatment caused the wet strengthening properties of the colloid to increase up to 36.2% (Run A-2), the absolute increase in each instance being between about one and two pounds per inch.

EXAMPLE 2

The following shows the effect of the addition of formaldehyde to a pre-formed melamine-formaldehyde cationic resin colloid as compared with the effect of adding the same amount of formaldehyde to the initial trimethylolmelamine-hydrochloric acid solution.

An aqueous acid methylolmelamine solution was prepared according to Example 1 by dissolving trimethylolmelamine in dilute hydrochloric acid containing 0.8 mol of the HCl per mol of melamine as described therein. The solution was divided into two parts. To one part was added 10 mols of formaldehyde per mol of combined melamine therein. Both solutions were allowed to age overnight resulting in development of resin colloids similar in appearance to the colloid solutions of Example 1. The solutions were then tested by the method of Example 1, the amount of resin added to the fibrous suspension being 0.5% of the dry weight of the fibers.

The results (Run No. 2 of the Table I below) are shown in comparison with the results obtained in Runs B and B-2 of Example 1 (Runs 1 and 3 below), which respectively show the effect obtained with a melamine-formaldehyde acid colloid to which no supplementary formaldehyde was added and the effect obtained by aging the colloid in the presence of 10 mols of added formaldehye.

Results are as follows:

Table I

| Run No. | $CH_2O$ Added Mols [1] | $CH_2O$ Added Where Added | Paper Basis Wt.[2] | Paper Wet Strength [3] | Paper Percent Increase |
|---|---|---|---|---|---|
| 1 | None | | 48.9 | 5.4 | |
| 2 | 10 | To initial trimethylolmelamine solution. | 49.1 | 5.6 | 3.7 |
| 3 | 10 | After formation of colloid. | 47.9 | 7.2 | 33.4 |

[1] Per mol of combined melamine present.
[2] Lb./25″ x 40″/500 ream.
[3] Lb./inch; corrected to 50 lb. basis weight.

The results showed that only a 3.7% increase in wet tensile strength occurred when the supplementary formaldehyde was added at the outset, that is, before colloid formation had begun. It was found, however, that much better results can be obtained by aging the solution for a longer time or by reducing the amount of acid, which accelerates the rate of colloid formation, or both. This is shown by the following experiments.

Aqueous acid methylolmelamine solutions containing 10% of trimethylolmelamine, 0.63 mol of hydrochloric acid per mol of melamine, and varying quantities of formaldehyde were prepared by dissolving the trimethylolmelamine in acidified formaldehyde solutions. The solutions were then aged at room temperature and samples were withdrawn after different aging times and tested by the method of Example 1 using 2% of resin on the dry weight of the fibers. The results are shown in the following Table II in which the added formaldehyde is expressed as mols per mol of combined melamine and the basis weight and wet strength are in the units indicated in Table I.

Table II

| Mols Added, $CH_2O$ | Aged 1.5 Hrs. | | Aged 4 Hrs. | | Aged 26 Hrs. | |
|---|---|---|---|---|---|---|
| | Basis Wt. | Wet Strength | Basis Wt. | Wet Strength | Basis Wt. | Wet Strength |
| None | 46.5 | 7.0 | 47.6 | 7.8 | 47.0 | 8.1 |
| 0.5 | 45.7 | 6.8 | 47.6 | 7.9 | 48.4 | 8.1 |
| 1 | 46.8 | 6.8 | 47.3 | 8.0 | 49.2 | 8.4 |
| 2 | 46.5 | 7.1 | 48.1 | 8.4 | 47.9 | 9.1 |
| 3 | 45.4 | 6.4 | 48.1 | 8.4 | 48.1 | 9.4 |
| 5 | 46.5 | 6.1 | 48.4 | 8.2 | 48.1 | 9.2 |

Another set of solutions containing 10% of the same trimethylolmelamine resin and 0.54 mol of hydrochloric acid per mol of melamine together with varying quantities of added formaldehyde was prepared and tested by the same method after aging for varying times, using 2% of resin on the dry weight of the fibers, the results being as follows:

Table III

| Mols Added, $CH_2O$ | Aged 1.5 Hrs. | | Aged 4 Hrs. | | Aged 7 Hrs. | | Aged 26 Hrs. | |
|---|---|---|---|---|---|---|---|---|
| | Basis Wt. | Wet Strength | Basis Wt. | Wet Strength | Basis Wt. | Wet Strength | Basis Wt. | Wet Strength |
| None | 47.8 | 7.4 | 50.5 | 8.5 | 49.5 | 7.8 | 48.4 | 7.4 |
| 0.5 | 48.4 | 7.7 | 49.7 | 8.3 | 49.7 | 8.7 | 47.9 | 7.8 |
| 1 | 48.7 | 8.0 | 49.7 | 8.4 | 49.7 | 8.4 | 47.9 | 7.8 |
| 2 | 49.5 | 8.5 | 49.2 | 9.1 | 50.5 | 8.4 | 48.9 | 8.6 |
| 3 | 48.9 | 8.5 | 48.4 | 8.8 | 49.5 | 9.2 | 48.6 | 8.5 |
| 5 | 48.7 | 8.1 | 49.2 | 9.5 | 49.7 | 9.1 | 48.6 | 9.2 |

These results show that substantially the same fortified melamine resin colloid is produced by the two methods; i.e., either by adding formaldehyde to a pre-formed colloid or by incorporating the formaldehyde in the initial acidified trimethylolmelamine solution, although the latter method requires a longer aging period under the same conditions. This indicates that in both methods the regular or parent colloid is first formed and is then fortified by reaction with the added formaldehyde. Acid colloids prepared by the second method also show the same improved performance in aqueous paper pulp systems having a high sulfate ion content, as is shown by Table IV. The results in this table were obtained with the same paper pulp and test solutions used in obtaining the data of Table III, using 2% of resin on the dry weight of the fibers, but samples of these solutions were added to the paper pulp suspensions after their sulfate ion content has been adjusted to the concentrations indicated by adding sodium sulfate. The wet strength measurements are recalculated to a uniform basis weight of 50.

Table IV

10% TRIMETHYLOLMELAMINE IN WATER CONTAINING 0–5 MOLS $CH_2O$ AND 0.54 MOL OF HCl PER MOL OF MELAMINE, AGED 26 HRS.

| Mols | $CH_2O$, p.p.m. | Wet Tensile Strength, Lbs. per inch width | | | | | |
|---|---|---|---|---|---|---|---|
| | | None | 0.5 | 1 | 2 | 3 | 5 |
| $SO_4$ | 25 | 7.6 | 8.2 | 8.2 | 8.8 | 8.8 | 9.5 |
| $SO_4$ | 425 | 5.2 | 5.7 | 6.1 | 7.5 | 8.5 | 8.9 |
| $SO_4$ | 825 | 3.7 | 4.7 | 5.8 | 7.0 | 7.9 | 8.4 |
| $SO_4$ | 1,625 | 3.4 | 3.7 | 4.7 | 6.2 | 7.1 | 7.7 |

The identity of the two colloids can also be shown by analyzing them for combined formaldehyde. The colloids tabulated below as "successive" were prepared by dissolving a commercial trimethylolmelamine sold as "Parez 607" to a 12% solution in water containing 0.72 mol of hydrochloric acid per mol of melamine, aging for 3 hours at room temperature to form the parent colloid, adding the quantities of formaldehyde indicated as aqueous 37% formalin and aging 24 hours at room temperature. The "simultaneous" colloids were prepared by mixing together the same quantities of water, HCl and formalin, dissolving the same amount of resin in the mixture and aging for the same time.

Samples of the colloids were analyzed for free formaldehyde by a method based on titration of the sodium hydroxide liberated when the free formaldehyde in the solution reacts with sodium sulfite to form the bisulfite-formaldehyde addition product. The combined formaldehyde was calculated by subtracting the free formaldehyde value, determined by this method, from the total amount of formaldehyde present. The analysis is conducted by adding 1 gm. of the colloidal resin solution to 100 gm. of water, adding 10–15 drops of thymolphthalein indicator and neutralizing with dilute sodium hydroxide solution to a slight blue color. A measured volume, either 10 or 15 ml., of 0.5 N HCl is added with stirring followed by 25 ml. of a saturated neutral $Na_2SO_3$ solution. After stirring for 5 seconds the solution is titrated rapidly with 0.5 N NaOH solution, which measures the excess acid. The free formaldehyde is calculated by the formula $$\frac{\text{Net ml. of HCl} \times 0.5 \times 0.03 \times 100}{\text{Sample weight}}$$

= percent free $CH_2O$ in solution

When samples of several resins are analyzed by this method under identical conditions (time, acid content, sample weight, etc.) the results are comparable but their absolute values are not necessarily accurate. In other words the test method shows the similarity in combined formaldehyde content between colloid solutions having the same content of total formaldehyde when made by the "simultaneous" and "successive" procedures but indicates only roughly and between wide limits, if at all, the actual molar proportion of formaldehyde to melamine in the resins.

Other samples of the same colloids were used in making wet strength paper by the procedure of Example 1 using 2% of resin on the dry weight of the fiber. The results are shown in Table V in which the combined formaldehyde is expressed as mols per mol of melamine and the wet strength figures are recalculated to a uniform basis weight of 50.

Table V

| Mols of $CH_2O$ Added | Method of Preparation | | | |
|---|---|---|---|---|
| | Successive | | Simultaneous | |
| | Combined $CH_2O$ | Wet Strength | Combined $CH_2O$ | Wet Strength |
| None | 2.5 | 7.9 | 2.5 | 7.9 |
| 1 | 2.7 | 8.7 | 2.7 | 8.4 |
| 2 | 2.9 | 8.9 | | 8.8 |
| 3 | | | 2.9 | 9.0 |
| 5 | 3.1 | 9.2 | 3.1 | 9.2 |
| 10 | 4.4 | 9.6 | 4.6 | |
| 15 | 4.2 | 9.0 | 4.3 | |
| 20 | 4.6 | 9.4 | 4.7 | |

EXAMPLE 3

The following illustrates the fortifying action of formaldehyde upon a melamine copolymer resin colloid solution.

A mixture of 260 gm. of melamine (2.06 mol), 124 gm. of urea (2.06 mol), 605 gm. of 55% methyl formcel (containing 332 gm. or 11.1 mols of $CH_2O$) and 9 gm. of triethanolamine were charged into a reaction vessel equipped with stirrer, thermometer and reflux condenser. The pH of the slurry was adjusted to 8.1 and gently heated. The mixture was allowed to reflux and the pH maintained at 8.1. The product was rapidly cooled when it reached a viscosity slightly short of 435 cp. and the pH adjusted to 9.0 with dilute sodium hydroxide.

The syrup thus obtained was converted to aqueous acid resin colloid form by mixing 100 gm. of the syrup with sufficient 20° Bé. hydrochloric acid to provide 0.8 mol of HCl per mol of combined melamine present. Sufficient water was then added to adjust the volume to 700 ml. The resulting solution contained 10 gm. resin solids per 100 ml. and developed an equbrium blue colloidal haze on aging for eight hours at room temperature.

Two aliquots of the colloid solution thus obtained were removed. To one was added 10 mols of formaldehyde (as 37% formalin) per mol of combined melamine therein. To the other (the control) was added an equal volume of water. Both solutions were aged over night and were tested by the method of Example 1 with the following results:

| Run No. | Basis Wt.[1] | Percent Resin Added [2] | Wet Strength [3] | Increase Lb./in. | Increase Percent |
|---|---|---|---|---|---|
| Control A | 47.9 | 0.5 | 4.6 | | |
| 1 | 48.4 | 0.5 | 6.3 | 1.7 | 37.0 |
| Control B | 48.4 | 1.0 | 6.3 | | |
| 2 | 49.2 | 1.0 | 7.7 | 1.4 | 22.3 |

[1] Sheets 25″ x 40″/500 ream.
[2] Resin solids based on dry weight of the fibers.
[3] Lb./in. TAPPI method (corrected to 50 lb. basis weight).

The results indicate that the invention is applicable to mixed melamine resin colloid solutions generally.

EXAMPLE 4

A melamine-formaldehyde (M-F) cationic acid colloid solution was prepared by dissolving 25 parts by weight of spray-dried trimethylolmelamine powder in 193 parts of 0.43 N HCl and aging the solution for four hours at room temperature.

Samples were withdrawn and converted to sulfate ion resistant form by addition of 37% aqueous formalin solution in proportion shown in the table below, followed by aging the mixture for four hours. The addition of 3.75 parts by weight of 37% formalin to 87 parts by weight of the colloid solution was equivalent to the addition of one mol of $CH_2O$ per mol of combined melamine therein.

A melamine-urea-formaldehyde (M-U-F) resin solution was also prepared by refluxing a mixture of 260 parts of melamine, 124 parts of urea, 605 parts of methyl formcel (a 55% by weight solution of formaldehyde in aqueous methanol) and 9 parts of triethanolamine adjusted to pH 8.1 with sodium hydroxide or formic acid until a Gardner-Holdt viscosity of Q (435 cp.) at 25° C. was attained, the pH of the reaction mixture being maintained at 8.1 by addition of sodium hydroxide or formic acid as required from time to time. The reaction was terminated by raising the pH to 9 and cooling. The colloid was formed by diluting 100 gm. of the product at 70% solids to 700 ml. with water containing 17.9 gm. of 20° Bé. hydrochloric acid and aging six hours in the presence of added formaldehyde in amount shown in the table below, and a control colloid was made by addition of an equivalent volume of plain water.

Papermaking fibrous suspensions were prepared by beating bleached northern kraft pulp in distilled water to a Green freeness shown in the table below, diluting the slurries to a consistency of 0.6% by addition of distilled water, and adjusting the dissolved sulfate ion content to 50 p.p.m. by addition of 2% of alum based on the dry weight of the fibers as conditioning agent, and adjusting the pH to 4.5 by addition of sodium hydroxide.

The wet strength developed in paper by use of the above-described acid colloid solutions added to the pulp in the presence of about 50 parts per million of dissolved sulfate ions (known from experience to be about the optimum concentration for development of highest wet strength) and in the presence of various high concentrations of dissolved sulfate ions was determined by adjusting the dissolved sulfate ion content of aliquots of the pulp to the values shown in the table below by addition of sodium sulfate, adding acid colloid solution in amount shown in the table, forming the pulps into handsheets on a Nash handsheet machine at a basis handsheet of 45–50 lb. (25″ x 40″/500 ream), heating the sheets for one minute at 240° F. on a laboratory rotary drum drier to dry the fibers and cure the resin thereon, conditioning the sheets at 73° F. for 24 hours and 50% relative humidity, and subjecting the sheets to the TAPPI wet tensile strength test. Results are as follows:

| Series | Colloid Name [a] | Colloid Percent Added [b] | Pulp Freeness, ml. | Wet Tensile Strength, Lb./in.[c] 50 / 0 | 300 / 0 | 300 / 10 | 450 / 10 | 850 / 10 | 1,650 / 0 | 1,650 / 5 | 1,650 / 10 |
|---|---|---|---|---|---|---|---|---|---|---|---|
| A | M-F | 0.5 | 460 | 5.6 | 3.4 | 5.5 | 5.4 | 5.2 | | | |
| B | M-F | 2.0 | 460 | 9.6 | 6.5 | 9.5 | 9.4 | 9.1 | | | |
| C | M-F | 2.0 | 540 | 8.5 | | | | | 3.8 | 7.5 | 9.8 |
| D | M-U-F | 2.0 | 560 | 8.0 | | | | | 3.3 | 5.5 | 6.7 |

[a] For abbreviations see above.
[b] Calculated as trimethylolmelamine (plus dimethylolurea in Series D) on dry weight of fibers.
[c] Upper row of column headings designates p.p.m. of dissolved $SO_4$ in pulp; lower row designates mols of $CH_2O$ added to colloid solution to counteract effect of such ions. Wet strength values corrected to 50 lb. basis weight (25″ x 40″/500 ream).

The results of Series A and B show that 300 parts per million of dissolved sulfate ions decreased the wet strength of the paper by about one-third, but that this decrease as well as the decrease caused by the presence of dissolved sulfate ions in amount up to 850 parts per million were very nearly completely counteracted by pre-treatment of the colloid with 10 mols of formaldehyde. The results of Series C (made at still higher dissolved sulfate ion concentrations) show that the pre-treatment of the colloid with only 5 mols of formaldehyde produced paper having 88.9% of the strength it would otherwise have, and that 10 mols of formaldehyde more than counteracted the detrimental effect of the sulfate ions. The results of Series D show that melamine-urea-formaldehyde colloid responds very favorably to the treatment.

EXAMPLE 5

The following illustrates application of the method of the present invention to the large scale manufacture of rosin sized wet strength paper wherein the white water is recycled.

sheeting and drying said suspension to form paper containing said colloid in thermocured form.

11. A method of making melamine resin bonded wet strength paper from aqueous cellulose fiber suspensions having a high content of dissolved sulfate ions, which comprises: preparing an aqueous acid solution of a colloidal cationic melamine-formaldehyde condensate at a pH within the range of 0.5 to 5 when measured at 12% solids, adding to said colloid solution a pre-determined amount of formaldehyde substantially sufficient to counteract the detrimental effect of said dissolved sulfate ions on the wet-strengthening properties of said colloid and reacting it therewith by aging the resulting solution, forming a suspension of papermaking cellulose fibers in an aqueous medium containing more than about 150 parts per million of dissolved sulfate ions, adding said formaldehyde-reacted colloid solution to said suspension in amount sufficient to provide a small but effective amount of said colloid as wet-strengthening agent, and sheeting and drying said suspension to form paper containing said resin in the thermocured form.

12. A method of making paper composed of fibers having a uniformly adsorbed content of melamine wet strength acid colloid and alum precipitated rosin size, said method minimizing discharge of white water having a high content of dissolved sulfate ions which comprises preparing an aqueous acid solution of a resinous colloidal cationic melamine-formaldehyde condensate at a pH within the range of 0.5 to 5 when measured at 12% solids, adding to said solution between about 3 and 10 mols of formaldehyde per mol of combined melamine therein, aging the resulting solution until said formaldehyde has reacted with said colloid, preparing an aqueous suspension of papermaking cellulose fibers at high consistency, sizing said fibers by addition of rosin size and alum to said suspension, diluting said suspension of sized fibers to sheeting consistency by addition of recycled white water and adding an effective amount of said equilibrium colloid solution as wet strength agent, sheeting the fibers from said suspension to form paper, recycling the white water from said sheeting to said suspension of sized fibers as aforesaid and drying the paper at an elevated temperature thereby converting said resin to thermocured form.

References Cited in the file of this patent

UNITED STATES PATENTS

| | | |
|---|---|---|
| 2,197,357 | Widmer et al. | Apr. 16, 1940 |
| 2,345,543 | Wohnsiedler et al. | Mar. 28, 1944 |
| 2,548,513 | Boughton | Apr. 10, 1951 |
| 2,559,220 | Maxwell et al. | July 3, 1951 |
| 2,559,221 | Maxwell et al. | July 3, 1951 |
| 2,577,767 | Jones | Dec. 11, 1951 |
| 2,625,524 | Kvaines | Jan. 13, 1953 |
| 2,769,799 | Suen et al. | Nov. 6, 1956 |
| 2,827,441 | Romatowski | Mar. 18, 1958 |
| 2,841,571 | Wohnsiedler | July 1, 1958 |

FOREIGN PATENTS

| | | |
|---|---|---|
| 622,905 | Great Britain | May 10, 1949 |
| 461,848 | Canada | Dec. 20, 1949 |

2,000 lbs. of unbleached southern kraft pulp were refined at 6% consistency in water containing 100 parts per million of dissolved sulfate ions by weight to a Green freeness of 600 ml., after which the pulp was treated with 30 lbs. of rosin size and 50 lbs. of papermaker's alum (solids based on the dry weight of the fibers). At this point the aqueous phase contained 725 parts per million of dissolved sulfate ions.

The pulp was pumped to a papermaking machine and diluted at the fan pump to 0.6% consistency by addition of recirculated white water (containing 800 parts per million of dissolved sulfate ions). At the same time 2% (resin solids based on the dry weight of the fibers) of formaldehyde treated melamine-formaldehyde acid colloid was added. The colloid solution had been prepared by the method of Example 4 and had been aged over night in the presence of 10 mols of added paraformaldehyde.

The pulp was sheeted at a basis weight of 40 lbs. (24" x 36"—500 sheets per ream) on a Fourdrinier wire and dried on steam-heated rolls to a moisture content of 6% by weight, the resin being well cured during the drying.

The paper was found to have a wet strength (TAPPI) of 6.1 lb. per linear inch. From experience it is known that had the step of treating the colloid with the formaldehyde been omitted, the paper would have had a wet strength of 3.2 lb. per linear inch.

This is a continuation-in-part of my copending applications Serial No. 614,747 filed October 8, 1956, and Serial No. 681,826 filed September 3, 1957, both of which are abandoned.

I claim:

1. An improved melamine-formaldehyde resin colloid solution consisting essentially of the product obtained by reacting an effective amount of formaldehyde within the range of about 0.5–15 mols per mol of melamine with a colloidal aqueous solution of a partially polymerized, positively charged melamine-formaldehyde condensation product having a pH value within the range of about 0.5 to 5 when measured at 12% resin solids and a degree of polymerization such that the resin particles are within the colloidal range by aging a mixture thereof until its wet-strengthening properties for waterlaid cellulosic papermaking fibers have substantially increased.

2. An improved melamine-formaldehyde resin colloid solution consisting essentially of the product obtained by reacting an effective amount of formaldehyde within the range of about 0.5–15 mols per mol of melamine with a colloidal aqueous solution of a partially polymerized, positively charged melamine-formaldehyde condensation product containing about 0.5 to 1.3 mols of hydrochloric acid for each mol of combined melamine therein having a pH value within the range of about 0.5 to 5 when measured at 12% resin solids and a degree of polymerization such that the resin particles are within the colloidal range by aging a mixture thereof until its wet-strengthening properties for waterlaid cellulosic papermaking fibers have substantially increased.

3. A method of producing an improved melamine-formaldehyde resin colloid solution which comprises reacting an effective amount of formaldehyde within the range of about 0.5–15 mols per mol of melamine with a colloidal aqueous solution of a partially polymerized, positively charged melamine-formaldehyde condensation product having a pH value within the range of about 0.5 to 5 when measured at 12% resin solids and a degree of polymerization such that the resin particles are within the colloidal range by aging a mixture thereof until its wet-strengthening properties for waterlaid cellulosic papermaking fibers have substantially increased.

4. A method of making wet-strength paper which comprises adding to a water suspension of cellulosic papermaking fibers as wet-strengthening agent a melamine-formaldehyde resin colloid solution prepared by reacting an effective amount of formaldehyde within the range of about 0.5–15 mols per mole of melamine with a colloidal aqueous solution of a partially polymerized, positively charged melamine-formaldehyde condensation product having a pH value within the range of about 0.5 to 5 when measured at 12% resin solids and a degree of polymerization such that the resin particles are within the colloidal range, forming the treated fibers into paper, and heating the paper to cure the resin adsorbed therein.

5. A method according to claim 4 in which the water suspension of cellulosic papermaking fibers contains more than about 150 parts per million of dissolved sulfate ion.

6. In the manufacture of wet-strength paper by a process which comprises forming an aqueous suspension of papermaking cellulosic fibers, forming an aqueous cationic colloidal melamine-formaldehyde resin solution, adding said colloid solution to said suspension as wet strengthening agent, sheeting the fibers to form a wet web having said resin colloid adsorbed therein, and heating the web to dry the same and cure the resin adsorbed therein whereby at least some of the fibers therein are bonded together by the adsorbed resin, the method of increasing the wet strength of the paper produced by said process which comprises adding formaldehyde to said resin colloid solution in an amount within the range of about 0.5–15 mols per mol of melamine and aging the resulting solution at a pH within the range of 0.5 to 5 when measured at 12% resin solids.

7. Paper composed of waterlaid cellulosic fibers bonded together by a content of a heat-cured melamine-formaldehyde resin adsorbed from a resin colloid obtained by reacting an effective amount of formaldehyde within the range of about 0.5–15 mols per mol of melamine with a colloidal aqueous solution of a partially polymerized, positively charged melamine-formaldehyde condensation product having a pH value within the range of about 0.5 to 5 when measured at 12% resin solids and a degree of polymerization such that the resin particles are within the colloidal range, said paper being characterized by a substantially higher degree of wet tensile strength as compared with paper of the same basis weight prepared from the same stock and containing the same amount of melamine-formaldehyde resin adsorbed from a colloidal aqueous solution of partially polymerized, positively charged melamine-formaldehyde condensation product without said formaldehyde reaction.

8. A method of making wet-strength paper which comprises preparing a suspension of cellulosic papermaking fibers in water containing more than about 150 parts per million of dissolved sulfate ions, adding thereto the sulfate ion-resistant reaction product of a melamine-formaldehyde resin acid colloid with from about 3 to 10 mols of additional formaldehyde for each mol of melamine in said resin at a degree of acidity corresponding to about 0.5–0.8 mol of hydrochloric acid for each mol of melamine and adsorbing said reaction product on said fibers in the presence of said sulfate ions, forming the treated fibers into paper, and heating the paper to cure the resin adsorbed therein.

9. A method according to claim 8 wherein the consistency of the fiber suspension on addition of the colloid solution is between about 0.2% and 1%.

10. A method of making melamine resin bonded wet-strength paper from aqueous cellulose fiber suspensions having a high content of dissolved sulfate ions which comprises preparing a colloidal aqueous acid solution of a partially polymerized cationic melamine-formaldehyde condensate at a pH within the range of 0.5 to 5 when measured at 12% solids, adding to said colloidal solution between about 3 and 10 mols of formaldehyde per mol of combined melamine therein and reacting it therewith by aging the resulting solution, forming a suspension of papermaking cellulose fibers in an aqueous medium containing more than about 150 parts per million of dissolved sulfate ions, adding said formaldehyde-reacted colloid solution in wet strengthening amount to said suspension, and

UNITED STATES PATENT OFFICE
CERTIFICATE OF CORRECTION

Patent No. 2,986,489                                May 30, 1961

Charles S. Maxwell

It is hereby certified that error appears in the above numbered patent requiring correction and that the said Letters Patent should read as corrected below.

Column 8, Table I, for the heading "$CG_2O$ Added" read -- $CH_2O$ Added --.

Signed and sealed this 12th day of December 1961.

(SEAL)
Attest:

ERNEST W. SWIDER
Attesting Officer

DAVID L. LADD
Commissioner of Patents
USCOMM-DC